United States Patent
Kuo

(10) Patent No.: US 11,412,177 B1
(45) Date of Patent: Aug. 9, 2022

(54) METHOD AND APPARATUS FOR TRANSMITTING AND RECEIVING AUDIO OVER ANALOG VIDEO TRANSMISSION OVER A SINGLE COAXIAL CABLE

(71) Applicant: Techpoint, Inc., San Jose, CA (US)

(72) Inventor: Feng Kuo, San Jose, CA (US)

(73) Assignee: TECHPOINT, INC., San Jose, CA (US)

( * ) Notice: Subject to any disclaimer, the term of this patent is extended or adjusted under 35 U.S.C. 154(b) by 0 days.

(21) Appl. No.: 17/373,625

(22) Filed: Jul. 12, 2021

(51) Int. Cl.
*H04N 7/08* (2006.01)
*H04N 5/073* (2006.01)
*H04N 7/01* (2006.01)
*H04N 5/38* (2006.01)

(52) U.S. Cl.
CPC ............ *H04N 7/08* (2013.01); *H04N 5/0736* (2013.01); *H04N 5/38* (2013.01); *H04N 7/01* (2013.01)

(58) Field of Classification Search
CPC .......... H04N 7/08; H04N 5/0736; H04N 5/38; H04N 7/01
See application file for complete search history.

(56) References Cited

U.S. PATENT DOCUMENTS

| 10,687,011 B2 * | 6/2020 | Kuo | H04N 7/01 |
| 10,750,117 B1 * | 8/2020 | Kuo | H04N 7/085 |
| 2008/0095518 A1 * | 4/2008 | Hsieh | H04N 7/083 386/278 |
| 2008/0278567 A1 * | 11/2008 | Nakajima | H04N 7/002 348/14.02 |
| 2010/0182402 A1 * | 7/2010 | Nakajima | H04N 5/38 348/E13.001 |
| 2013/0148518 A1 * | 6/2013 | Liao | H04N 21/4305 370/252 |
| 2017/0280087 A1 * | 9/2017 | Kuo | H04N 5/205 |

* cited by examiner

*Primary Examiner* — Paulos M Natnael
(74) *Attorney, Agent, or Firm* — Pillsbury Winthrop Shaw Pittman LLP

(57) ABSTRACT

Disclosure herein includes descriptions of a method for transmission of digital audio over analog video data with a single cable. The method comprising receiving, by a video transmitter, a digital video signal and one of a digital or an analog audio signal. Sampling, by an audio analog-to-digital converter (ADC), the audio signal if it is an analog audio signal. Storing, in a First-in-First-Out (FIFO) buffer, digital audio data corresponding to the sampled analog audio signal; reading, by an arbiter, the digitized audio samples, in response detecting an availability of data in the FIFO buffer and formatting the serialized audio bits with a digital start code; inserting the serialized audio bits and the digital start code into a blanking period of the digital video signal, thereby generating a combined digital audio and video signal and converting, by a digital-to-analog converter (DAC), the combined digital audio and video signal to analog, thereby generating a combined analog audio and video stream including audio data in a native form; and transmitting the combined analog audio and video stream to a receiver in one direction. In another embodiment, an analog signal is transmitted in the opposite direction.

7 Claims, 12 Drawing Sheets

METHOD AND APPARATUS FOR TRANSMITTING AND RECEIVING AUDIO OVER ANALOG VIDEO TRANSMISSION OVER A SINGLE COAXIAL CABLE

FIELD

The application relates in general to digital video transmission and in particular to methods and apparatuses for transmitting and receiving audio over analog video transmission over a single coaxial cable.

BACKGROUND

It is apparent when it comes to the need to send both analog audio and video data over a distance; one cable is better than two cables in terms of cost and complexity. Various methods and apparatuses have been proposed to reduce the cost and complexity of sending both analog and video signal by transmission over a single coaxial cable. To avoid interference between the analog audio and video data on a single cable, there are potentially two ways to get the required separation. Frequency multiplexing audio data and video data and transmitting each data signal over distinct non-overlapping frequency band is known. Interleaving an audio signal and a video signal in the time domain thereby having the audio and video data present in the signal at different times without interfering with each other is known. Interleaving audio data when active video is not present during the video-blanking is also known. However, current signaling protocols are complex and require intensive calculation for interleaving audio data in with video data.

For example, U.S. application Ser. No. 14/442,803 of Zhejiang Dahua Technology Co., Ltd. discloses a method of and apparatus for transmitting a high-definition video signal to address the problem in the prior art, i.e., the cost and complexity of transmitting analog and audio over a distance using a single coaxial cable. In particular, the '803 Application proposed to buffer audio data by calculating an audio duration for every each row in the video frame that audio data is superimposed. However, the proposed method of the '803 Application creates the need to for calculating and storing an audio duration size in every active row of video data. Doing so requires storing and buffering audio durations that are not small and require burdensome buffering and storage requirements, which complicates the coding scheme. The exemplary implementations described herein do not require calculating the number of audio samples to be stored in the buffer and transmitted per frame basis and employs much smaller buffer, reducing cost of manufacture and operating power requirements.

Accordingly, there remains a need in the art for a solution that addresses the problems discussed above among others.

SUMMARY

One or more embodiments herein relate generally to a method and system for transmitting digital audio and video data over a transmission medium in analog form using a single coaxial cable. More specifically, one or more embodiments herein disclose a method or apparatus for efficiently transmitting audio data in a video blanking period of an analog video signal in a manner that does not require intensive calculation of the audio duration on a row by row basis.

According to one aspect, a method of one or more embodiments herein may include receiving an audio signal in analog or digital form, and quantizing the signal if in the analog form into a digital format to result in a plurality of quantized audio data. The method includes buffering one or more of the plurality of quantized audio data and receiving a video signal that includes a blank interval and at least one portion of video data disposed therein. In some embodiments, the method includes generating one or more quantized audio pulses corresponding to the one or more of the plurality of quantized audio data stored in the buffer and an audio header corresponding to the one or more quantized audio pulses. The method includes identifying, without calculating, at least one permissible portion of the blank interval corresponding to a first duration exceeding a predetermined duration of the audio header and the one or more quantized audio pulses. The method may conclude, in some embodiments, by multiplexing, in the at least one permissible portion of the blank interval, the audio header and the one or more audio pulses, with the at least one portion of video data resulting in a combined audio and video signal that represents at least a portion of the audio and video data.

According to another aspect of the invention a method of one or more embodiments herein may include receiving an analog video signal, the analog video signal including an audio header and one or more quantized audio pulses corresponding to quantized audio data, and detecting the audio header in a blank interval of the analog video. In some embodiments, the method includes, determining a reference level of the audio header, and extracting, in response to detecting the audio header, the one or more quantized audio pulses. In some embodiments, the method includes converting the one or more quantized audio pulses to an original value of the one or more quantized audio data based on the reference level of the audio header and storing the one or more quantized audio data in the original value in a First-in-First-Out (FIFO) buffer. In some embodiments, the method includes reconstructing, utilizing the FIFO buffer, continuous audio data from the one or more quantized audio data in the original value. For example, audio sample data stored in the FIFO buffer and a local audio clock that has substantially the same frequency as the original sampling clock at the transmitter side. Substantially the same means the difference is negligible.

Another aspect of one or more embodiments may include a method and apparatus for transmitting digital audio over analog video data with a single cable. The method includes receiving, at a transmitter, a digital video signal and an audio signal in analog or digital form, and sampling, by an analog-to-digital converter (ADC), the analog audio signal, if in analog form. The method includes storing, in a First-in-First-Out (FIFO) buffer, audio bits corresponding to the digital audio signal or sampled analog audio signal and reading, by an arbiter, the audio bits that have been serialized for output, in response detecting an availability of data in the FIFO buffer. The arbiter can detect the availability of the video blanking period and audio sample data in the FIFO before releasing one data sample from FIFO by serializing the sample data and at the same time appending a digital header or start code in the beginning of the sequence. Each FIFO entry contains one audio sample data converted by the ADC. The number of bits per sample depends on the ADC resolution. Serialization of bits for digital transmission happens at the output. These bits are represented by a digital value with certain duration and they will be subsequently converted to a pulse with certain height and duration by the DAC. The analog audio transmission works in a similar fashion except that the output of the arbiter are digital codes representing the start pulse height followed by audio sample code(s) all with some time duration so they will be analog pulses after converted to analog format by DAC as illustrated. In some embodiments, the method includes formatting the serialized audio bits with a digital start code and inserting the serialized audio bits and the digital start code into a blanking period of the digital video data, thereby generating a combined digital audio and video signal. Some embodiments include converting, by a digital-to-analog converter (DAC), the combined digital audio and video signal to analog, thereby generating a combined analog audio and video signal including an audio data stream in a native form and transmitting in one direction the combined analog audio and video signal to a receiver. The method can include receiving, at the receiver, the combined analog audio and video signal and converting, by an ADC, the combined analog audio and video signal to a combined digital audio and video signal. Such method includes extracting, utilizing an audio decoder, the audio data stream from the combined digital audio and video signal. In some embodiments, the method includes the video decoder providing timing information and location of the video blanking period to aid the searching for audio data by the audio decoder.

Another aspect of the one or more embodiments may include a method of two-way audio transmission, such that in addition to the transmission from the transmitter to the receiver as previously described, and the sampled audio signal being sampled at a first frequency, wherein the transmitter includes an opposite direction audio signal receiver, and wherein the receiver includes an opposite direction audio signal transmitter. With such a two-way configuration, there are included the steps of receiving, at the opposite direction audio signal transmitter included within the receiver, a second audio signal; determining, by the arbiter of the opposite direction audio transmitter and the video decoder of the receiver, one or more vertical blanking lines of the second digital video signal and one or more time slots within the one or more vertical blanking lines without audio data; sampling, by another analog-to-digital converter (ADC) disposed within the opposite direction signal transmitter, the second audio signal at a second frequency if the second audio signal is an analog audio signal; storing, in another First-in-First-Out (FIFO) buffer disposed within the opposite direction signal transmitter, second digitized audio samples corresponding to the second audio signal, which may be either the second audio signal if in digital form or the second digitized samples of the second (analog) audio signal; inserting start pattern and one or more second serialized audio data and/or end pattern into a vertical blanking interval of the combined analog audio and video stream; and transmitting, by the opposite direction signal transmitter disposed within the receiver to the opposite direction signal receiver disposed within the transmitter, an audio stream corresponding to the start and/or end patterns and the one or more second serialized audio bits to the transmitter that includes the audio receiver, wherein the transmitting of the audio stream occurs of the single cable in another direction opposite the one direction. It is noted that the audio data inserted can be one or multiple insertions per line.

The opposite direction audio signal receiver within the transmitter uses a clock frequency that needs to only be substantially the same as the frequency used by its corresponding opposite direction audio signal transmitter within the receiver, as a pair. It can be different than the frequency used by the opposite direct ion. When the video decoder on the receiver side decodes video correctly, both sides should preferably have the same video line information including sync, blanking, active video location. The method includes extracting the serialized audio data based on the one or more vertical blanking lines and one or more time slots and storing the extracted audio samples in a FIFO buffer. In some embodiments, the method includes utilizing predetermined clock frequencies which are substantially the same as the opposite audio transmitter clock frequency that is within the (video) receiver. The method includes, at the opposite direction audio signal receiver within the (video) transmitter, selecting an output sample frequency based on a transmission side clock frequency and retrieving the audio samples and outputting a reconstructed audio stream based on the output sample frequency. In some embodiments, the audio clock is set to a frequency substantially the same as the audio clock frequency used in the transmitter side (e.g., 8 KHz, 16 KHz, and the like). Output audio samples are extrapolated from the data stored in the FIFO buffer based on the difference between clocks for obtaining equal spaced audio data matching the receiver audio clock.

BRIEF DESCRIPTION OF THE DRAWINGS

These and other aspects and features of embodiments described herein will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
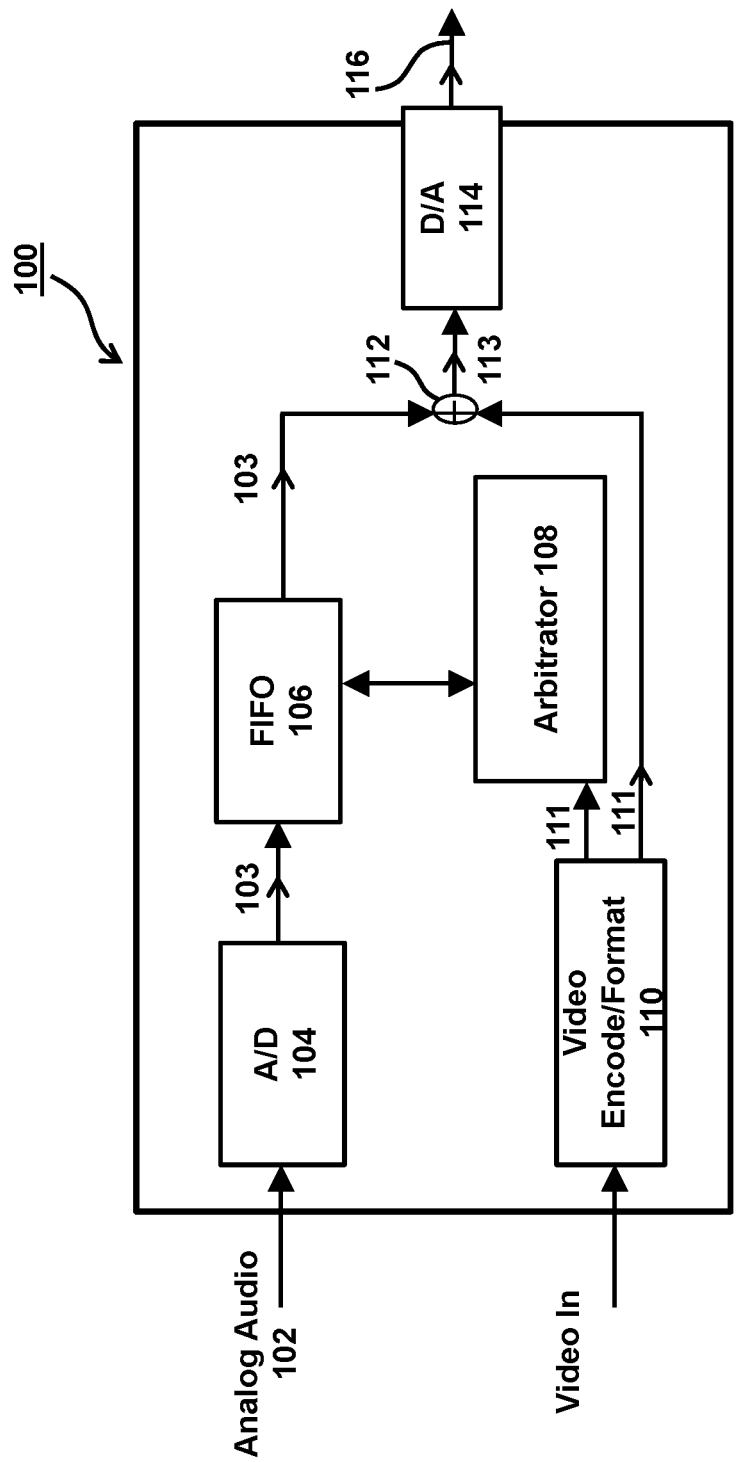
FIG. 1 illustrates a block diagram of an exemplary audio transmitter in accordance to one or more embodiments of the invention.

FIG. 1 illustrates an audio encoder system 100 on the transmitter side where an embodiment is applicable. As shown in FIG. 1, system 100 includes analog-to-digital converter (ADC) 104, buffer 106, arbiter 108, video encoder 110, signal combiner 112 and digital-to-analog converter (DAC) 114. In an exemplary embodiment, system 100 is configured to receive a continuous analog audio signal 102 and process analog audio signal 102 for transmission along with video signal 111, via a single transmission line.

In one embodiment, ADC 104 may be configured to receive audio signal 102 in analog or digital form, and if in analgo form, then sample analog audio signal 102 at a predetermined frequency. In one embodiment, the audio sampling rate may be set at less than a video line rate of video signal 111, doing so may prevent overflow in buffer 106. ADC 104 may be configured to output quantized audio data 103 corresponding to the sampled analog audio signal 102, which is needed when the audio signal is in analog form, but not when the analog signal is in digital form, as well be well understood. In one embodiment, ADC 104 may be configured to sample audio signal 102 at 8 kHz. In another embodiment, ADC 104 may be configured to sample audio signal 102 at 16 kHz. In yet another embodiment, ADC 104 may be configured to sample audio signal 102 at 32 kHz.

In some embodiments, ADC 104 may be configured to receive an analog audio signal 102, sample and quantize the analog audio signal 102 in digital format resulting in quantized audio data 103. In some embodiments, buffer 106 may be configured for buffering quantized audio data 103. Buffer 106 may be configured to receive quantized audio data 103 from ADC 104 and store entries until a video blanking period becomes available, which is discussed in further detail below, and may also be configured to directly receive various portions of the digital audio signal. In one embodiment, buffer 106 may include a first-in-first-out (FIFO) buffer configured to not alter the order in which quantized/digital audio data is received and transmitted by buffer 106. In another embodiment, buffer 106 may be configured to timestamp incoming quantized/digital audio data. In one embodiment, in response to buffering quantized audio data 103, buffer 106 may be configured to notify arbiter 108 that quantized/digital audio data is available in buffer 106. In one embodiment, buffer 106 may be configured to include interrupt I/O circuitry in communication with arbiter 108. In another embodiment, arbiter 108 may include polling I/O circuitry configured to poll buffer 106 to determine the presence of quantized/digital audio data 103 in buffer 106.

In some embodiments, arbiter 108 analyzes video signal 111 to determine the timing and presence of the video blanking interval of video signal 111, which is discussed in further detail below. In one embodiment, in response to the polling and/or interrupt, arbiter 108 may be configured to determine the availability of a video blanking period (not shown in FIG. 1) of video signal 111. In one embodiment, video signal 111 includes a blank interval and at least one portion of video data disposed therein. In one embodiment, the video blanking interval may include a horizontal sync pulse, a vertical sync pulse, a color sync pulse, and/or other data corresponding to video data of video signal 111. In another embodiment, the video blanking interval does not contain any sync pulses and/or other data corresponding to video data of video signal 111, and arbiter 106 or the video encoder 110 may be configured to insert sync pulses in a predetermined location of the video blanking interval based on a predefined video format, which is discussed in further detail below.

In some embodiments, in response to determining the timing and presence of the video blanking interval, arbiter 108 may be configured to command buffer 106 to transmit quantized audio data 103 corresponding to the availability of a video blanking period of video signal 111. When buffer 106 does not contain data entries (i.e., quantized audio data 103) at the time of determining the presence of the video blanking interval, the row will be skipped until there are entries stored in buffer 106. In one embodiment, arbiter 108 may include synchronization circuitry including one or more clocking circuits that processes video signal 11*l* and performs task management protocol for interleaving quantized audio data 103 with the video blanking period of video signal 111. In one embodiment, arbiter 108 may be configured to fetch or retrieve the quantized audio data from buffer 106.

In one embodiment, arbiter 108 may be configured to receive digital video signal 111 from video encoder 110. Arbiter 108 may be configured to check for the availability of quantized/digital audio data 103 stored in buffer 106 in response to approaching the blank interval time of video signal 111. In response to determining that quantized/digital audio data 103 is available in buffer 106, arbiter 108 may generate one or more sync pulses, one or more quantized audio pulses corresponding to quantized/digital audio data 103 stored in buffer 106, and an audio header describing the one or more quantized audio pulses. For example, the sync pulse generation may be performed by the video encoder 110, while arbiter 108 may determine when to insert the audio data and format the data accordingly. In one embodiment, the header may indicate the presence of audio data and may be utilized for decoding audio on a receiver end, which is discussed in further detail below. In other embodiments, in general, the sync pulses generation is by the video encoder (encoder). The arbiter determines when to insert the audio data and format the data accordingly. It is understood that the term "insert" or "inserting" when used herein should be broadly interpreted to include superimposing, combining, injecting or other manners of including a signal and/or its components, such as combining the audio signal with the existing combined audio video stream.

In one embodiment, video encoder 110 may be configured to generate digital video signal 111, and output video signal 111 to arbiter 108 and signal combiner 112. In another embodiment, video encoder 110 may relay an existing video signal received from a video source (not shown). In some embodiments, video encoder 110 may be configured to output video signal 111, which may be configured as 8-bit, 10-bit or 12-bit 4:4:4 or 4:2:2 YUV data. For example, in some embodiments, due to having a single cable, the UV data may be modulated before adding to the Y and sync to form one digital data before converting to analog. In other embodiments, YUV data may be interleaved in a predefined way together with sync before the DAC conversion. In some embodiments, video signal 111 may be configured using other sub-sampled formats. In some embodiments, video encoder 110 may include one or more analog processors, chrominance processor, luminance processor, clocking circuitry, and a host communication interface (not shown in FIG. 1).

As discussed above, arbiter 106 may be configured to determine the availability of a video blanking period of video signal 111. In some embodiments, arbiter 106 may include processing circuitry and memory storing firmware and/or other types of non-transitory computer readable instructions thereon. Arbiter 106 processing circuitry may be configured to execute instructions contained in the firmware and/or memory for implementing the exemplary embodiments described herein. In some embodiments, processing circuitry within arbiter 106 may include one or more hardware processors, one or more field programmable gate arrays (FPGA), alone and/or in combination.

In one embodiment, arbiter 106 may be configured to manage timing for interleaving and/or inserting quantized/ digital audio data 103 stored in buffer 106 with video signal 111 via clocking functionality (not shown in FIG. 1). In some embodiments, arbiter 106 may include clocking functionality for synchronizing quantized/digital audio data 103 with video signal 111. Arbiter 106 may include one or more digital signal processors (DSP), field programmable gate arrays (FPGA) and or application specific integrated circuits (ASIC). In one embodiment clocking circuitry of arbiter 108 may include one or more of phase locked loop (PLL) clock, a non-PLL clock, a quartz crystal oscillator, and LC resonance tank circuit, alone and/or in combination. Clocking circuitry may include additional timing and signal conditioning functionality including, for example, fan-out buffers, multipliers and dividers, synthesizers, alone and/or in combination.

As shown in FIG. 1, signal combiner 112 may be configured to receive quantized audio data 103 from buffer 106 and digital video signal 111 from video encoder 110. Signal combiner 112 may be configured to interleave quantized/ digital audio data 103 in the video blanking period of video data 111, which is described in further detail below. In one embodiment, signal combiner 112 may be configured to interleave quantized/digital audio data 103 with video signal 111 by inserting quantized/digital audio data 103 into the video blanking portion of video signal 111, and output a combined audio and video (A/V) digital signal 113 to digital-to-analog converter (DAC) 114.

In some embodiments, DAC 114, may include an 8 bit DAC, a 10 bit DAC, or of any higher bit width and operating at a specific frequency as required by video signal 111. For example, DAC 114 may run at 148.5 MHz, which is two times an input data rate of a standard HD digital video (e.g., 1080p30/25 and 720p60/50). In some embodiments, the amplitude of the DAC output signal can be set by an external current setting resistor (not shown in FIG. 1). DAC 114 may be configured to receive A/V signal 113 from signal combiner 112 in digital format, convert combined audio and video signal 113 to analog format, and output an analog audio and video (AV) signal 116 for transmission via a single transmission line (not shown in FIG. 1). In one embodiment, the signal transmission line may be a coaxial cable configured to transmit analog signal via one or more fiber optic cables and/or twisted pair wire transmission lines.

In one embodiment, video signal 111 may include a resolution of 1280×720p. Video blanking interval 210 may correspond to the video blanking period of a 1280×720P video signal. Video signal 111 may include streaming video frames, each frame including 1650 pixels per line with 1280 active video pixels. In one embodiment the blank interval of video signal 111 includes 370 pixels configured to contain the horizontal sync pulse, color sync pulse, and/or other data corresponding to the video data.

In one embodiment, for example, video signal 111 may correspond to the SMPTE 296M standard, wherein a 1280× 720P video frame has 750 horizontal lines or rows, of which 30 lines are a vertical blanking interval that do not contain video data. According to the numbering scheme of SMPTE 296M, lines 26-745 are active video frame data. Both active frames and vertical blanking intervals may include a respective video blanking interval 210. The video blanking interval may be the same size for each row of video signal 111 due to the periodic nature of the video blanking interval. In other embodiments, video signal 111 may correspond to other SMPTE standards including but not limited to: 259M, 344M, 292M, 372M, 424M, ST-2081, ST-2082, and/or ST-2083. It should be noted that the exemplary embodiments described herein are not limited to the line numbering scheme as described above. A person of ordinary skill in the art can apply the principal of the invention to any other numbering scheme after reading the disclosure provided herein.

In some embodiments, arbiter 108 in conjunction with signal combiner 112 may be configured to generate one or more quantized audio pulses (not shown in FIG. 1) corresponding to the one or more of the plurality of quantized audio data 103 stored in buffer 106. In the digital domain, this generating quantized audio pulses corresponds to digital data lasting the duration of the pulse. Arbiter 108 in conjunction with signal combiner 112 may also generate an audio header corresponding to one or more quantized audio pulses (not shown in FIG. 1). In some embodiments, arbiter 108 may be configured to cause buffer 106 to transmit the audio header to signal combiner 112, along with quantized audio data 103, for multiplexing into combined A/V signal 113. In one embodiment, signal combiner 112 and arbiter 108, may utilize time division multiple access (TDMA) multiplexing protocol in order to combine quantized audio data 113 and video signal 111, which is described in further detail below.

Figure 2:
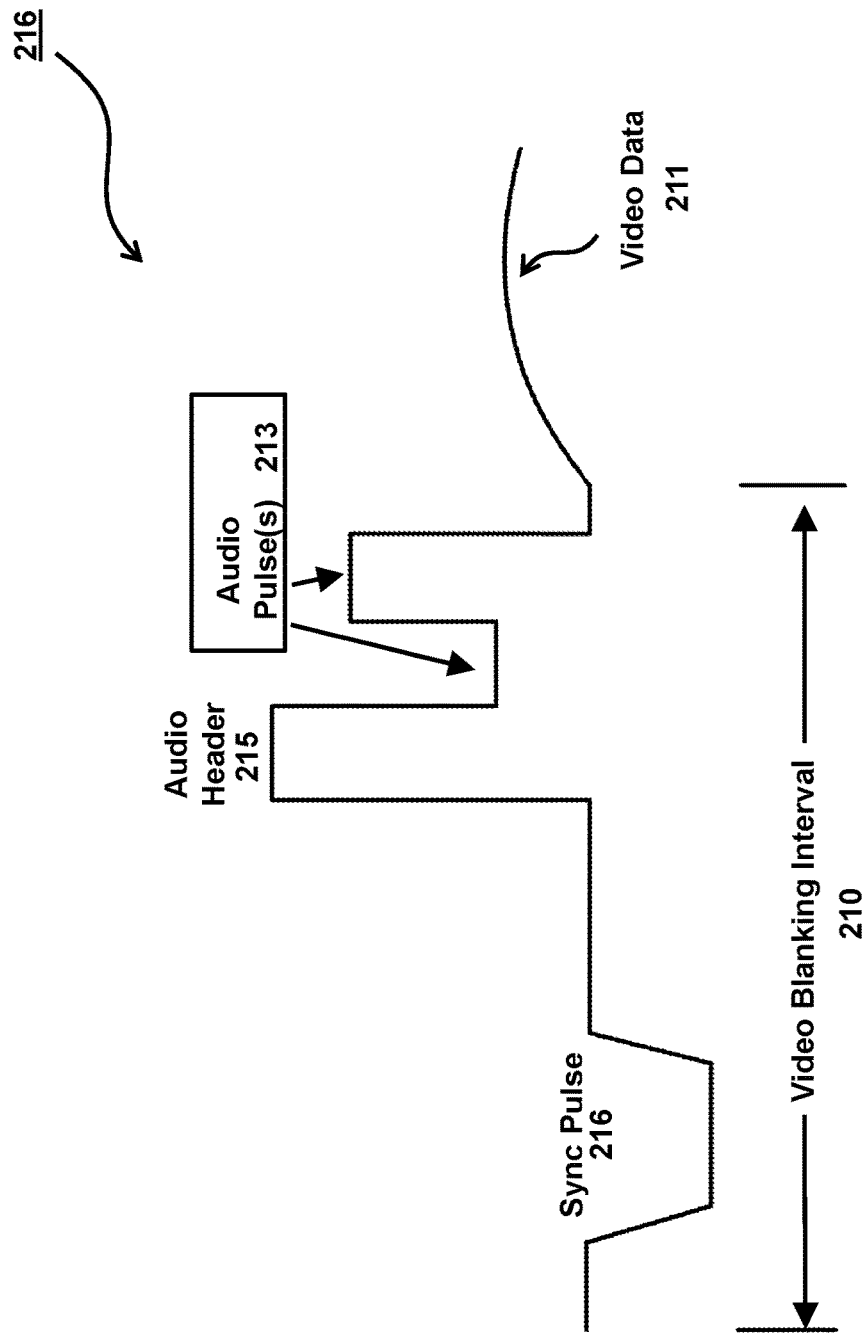
FIG. 2 illustrates a schematic diagram for an output analog video signal in accordance with one or more embodiments of the invention.

Referring now to FIG. 2 in conjunction with FIG. 1, FIG. 2 illustrates an exemplary A/V signal 216 according to one or more embodiments. A/V signal 216 may correspond to A/V signal 116 of FIG. 1. In some embodiments, A/V signal 216 depicted in FIG. 2 may correspond to a single active row of a single video frame of video signal 111. As shown in FIG. 2, A/V signal 216 may include video data 211 and video blanking interval 210. Video data 211 may correspond to video data of video signal 111 generated or received by video encoder 110, as discussed above. Video blanking interval 210 of combined A/V signal 116, 216 may include one or more audio pulses 213, audio header 215, and sync pulse 216. As shown in FIG. 2, video blanking interval 210 may exist before and after sync pulse 216. In some embodiments, sync pulse 216 may include a horizontal sync pulse, vertical sync pulse, color sync pulse, and/or other data corresponding to CODEC of video signal 116, 216.

In some embodiments, arbiter 108 may be configured to determine a sync pulse location of a sync pulse 216 in the video blanking interval 210. Arbiter 108 may be configured for identifying, without calculating, at least one permissible portion of the blank interval corresponding to a first duration exceeding a predetermined duration of the audio header and the one or more quantized audio pulses.

In another embodiment, arbiter 108 may be configured for identifying, without calculating, a sync portion configured to include one or more sync pulses based on a pre-defined video standard, the sync portion differing from the at least one permissible portion of the blank interval. In some embodiments, A/V signal 216 may include sync pulses and/or other data corresponding to video data 211 in video blanking interval 210. In one embodiment, identifying a sync pulse location may include digitizing an existing analog video signal (e.g., via ADC 104) and identifying the sync pulse location and blanking intervals from the digitized video stream.

In another embodiment, video signal 111 may include a pre-defined digital format having a video blanking interval that is devoid of sync pulses, and identifying the sync pulse locations may include communication between video encoder 110 and audio arbiter 108 regarding where (i.e., a temporal location) sync pulses 216 will be inserted according to the pre-defined video standard. For example, video encoder 110 may combine or modulate active YUV video data and include synchronization data to form a single video data stream for transmission. In some embodiments, arbiter 108 may include an audio encoder and/or a video encoder (not shown) having a pixel counter. Utilizing the pixel counter, arbiter 108 may identify insertion locations for sync and audio data that are predefined based on the count value of the pixel counter.

In one embodiment, because the transmission of digital video signal in digital format does not require sync or color sync data, identifying the sync pulse location and blank intervals portions that are devoid of sync pulses may include communication between the video encoder (e.g., combiner 112) and audio arbiter 108 regarding where the sync pulse 216 will be inserted according to a pre-defined video standard. Thus, determining a sync pulse location may include determining one or more portions of video blanking interval 210 that is/are free of any video related signals corresponding to video data 211 (e.g. horizontal/vertical/color sync pulse and/or other data corresponding to video data 211). Analog video transmission, however, includes sync pulses and digitizing the analog video stream (e.g., via ADC 104) may identify the temporal location of sync pulses present in video data 211. In another embodiment, arbiter 108 may be configured to determine a location of other data in the blanking interval (e.g., horizontal/vertical/color sync pulse and/or other data corresponding to video data 211) based on a predefined video format.

In some embodiments, video blanking interval 210 may include audio header 215 and one or more quantized audio pulse(s) 213. A single quantized audio pulse 213 may correspond to one digitized audio data (e.g., in 8/10/12/16 bit format) stored as one buffer entry. The level of audio pulse 213 (i.e. amplitude or voltage level) may linearly represent the digital data corresponding to quantized/digital audio data 103 stored in buffer 106. In one embodiment, for example, in the case of an 8-bit sample data, 00hex may include the lowest level of audio pulse(s) 213 and FFhex may include the highest level of audio pulse(s) 213. In some embodiments, other hexadecimal leveling protocol may be utilized for various video formats without diverting from the scope of the present embodiments described herein. In some embodiments, the duration of quantized/digital audio pulse(s) 213 may be pre-defined based on the particular video format of signal 116, 216.

As shown in FIG. 2, audio header 215 and quantized/digital audio pulses 213 each include a predetermined pulse duration (i.e., pulse width). Audio pulses may be distorted at the far end (i.e., receiver side) of the cable due to imperfect frequency response, thus pulse duration must be chosen accordingly. In some embodiments, the duration of each audio pulse 213 may be programmable and predetermined for each video format based on the blank space available and the cable length. Each video blanking interval 210 of signal 216 may have the same size/duration due to the periodic nature of the video blanking interval in each row of every frame of video signal 216. Thus, the duration or pulse width of quantized/digital audio pulses 213 and audio header 215 may be pre-defined for certain video formats in a manner such that at least one audio header 215 and one quantized/digital audio pulse 213 duration can fit in blanking interval 210. In some embodiments, based on the particular pre-defined video format, the duration of audio header 215 and quantized/digital audio pulses 213 are selected such that video blanking interval may include at least two quantized/digital audio data pulses 213.

For example, some video formats (e.g., SMPTE standards discussed above) may include a wider video blanking interval that provides sufficient space for more than one quantized/digital audio pulse 213. In some embodiments, in order to accommodate inserting two or more quantized/digital audio pulses 213 in each blanking interval 210, the pulse duration of quantized/digital audio pulses 213 and/or audio header 215 may be selected more narrowly, based on the duration of video blanking interval 210 of the particular video format. Doing so may increase the transfer data rate when two or more audio pulses 213 can be inserted into video blanking interval 210.

As discussed above, quantized/digital audio pulses 213 may include an analog representation of quantized audio data 102 stored in buffer 106 in reference to the header level of audio header 215. In some embodiments, audio header 215 may include a maximum signal value or a mid-level signal value of audio quantized audio pulses 213. In one embodiment, audio header 215 may be configured to serve as a flag to indicate valid audio data and as a reference level to decode quantized audio pulses 213 and reconstruct audio data to an original format by a downstream receiver, which is discussed in further detail below in the discussion of FIG. 3

In one embodiment, audio header 215 may correspond to a voltage level that is distinct from video blanking interval 210 and may be readily identified by a downstream audio receiver. The voltage level of audio header 215 may be configured to be readily differentiated in video blanking interval 210 and facilitates the determination by a downstream receiver that a particular video blanking interval 210 contains no audio data. In one embodiment, audio header 215 includes a zero audio level or an integer multiple of a zero audio level. The audio header may serve as a zero reference for decoding quantized audio pulses 213 into a bi-directional AC wave. In some embodiments, the one or more quantized audio pulses 213 are superimposed (i.e. interleaving or multiplexing) with a DC offset.

In one embodiment, audio header 215 may correspond to the DC offset during transmission, wherein audio header 215 may be utilized for recovering the DC offset in a downstream video receiver. During transmission of signal 216, the voltage level of audio pulses 213 can change for various reasons. The quantization level on a receiver side may also be different than the original DAC conversion level. Therefore, two distinct levels are needed to accurately recover the audio digital value of audio pulses 213. Thus in some embodiments audio header 215 may correspond to a predefined header level and the video blank level for reference to scale the received audio level accordingly. Thus, in some embodiments, audio header 215 may contain a DC offset plus a value that is half or full amplitude of the audio signal to aid the decoding by a downstream transmitter, for example, as discussed in FIG. 3A below.

In some embodiments, arbiter 108 in communication with signal combiner 112 may be configured to interleave audio header 215 and one or more audio samples (or portions if digital) 213 at a predetermined time in video blanking interval 210. In one embodiment, interleaving may include multiplexing, in the permissible portion of blank interval 210, audio header 215 and one or more audio pulse(s) 213, with the at least one portion of video data 211 resulting in a combined audio and video signal 216 that represents at least a portion of the audio and video data. While FIG. 2 depicts audio header 215 and audio samples 213 located between video data 211 and sync pulse 216, in some embodiments, header 215 and audio samples(s) 213 may be inserted before or after sync pulse 216. In some embodiments, audio header 215 and audio samples 213 may be included both before and after sync pulse 216.

Figure 3:
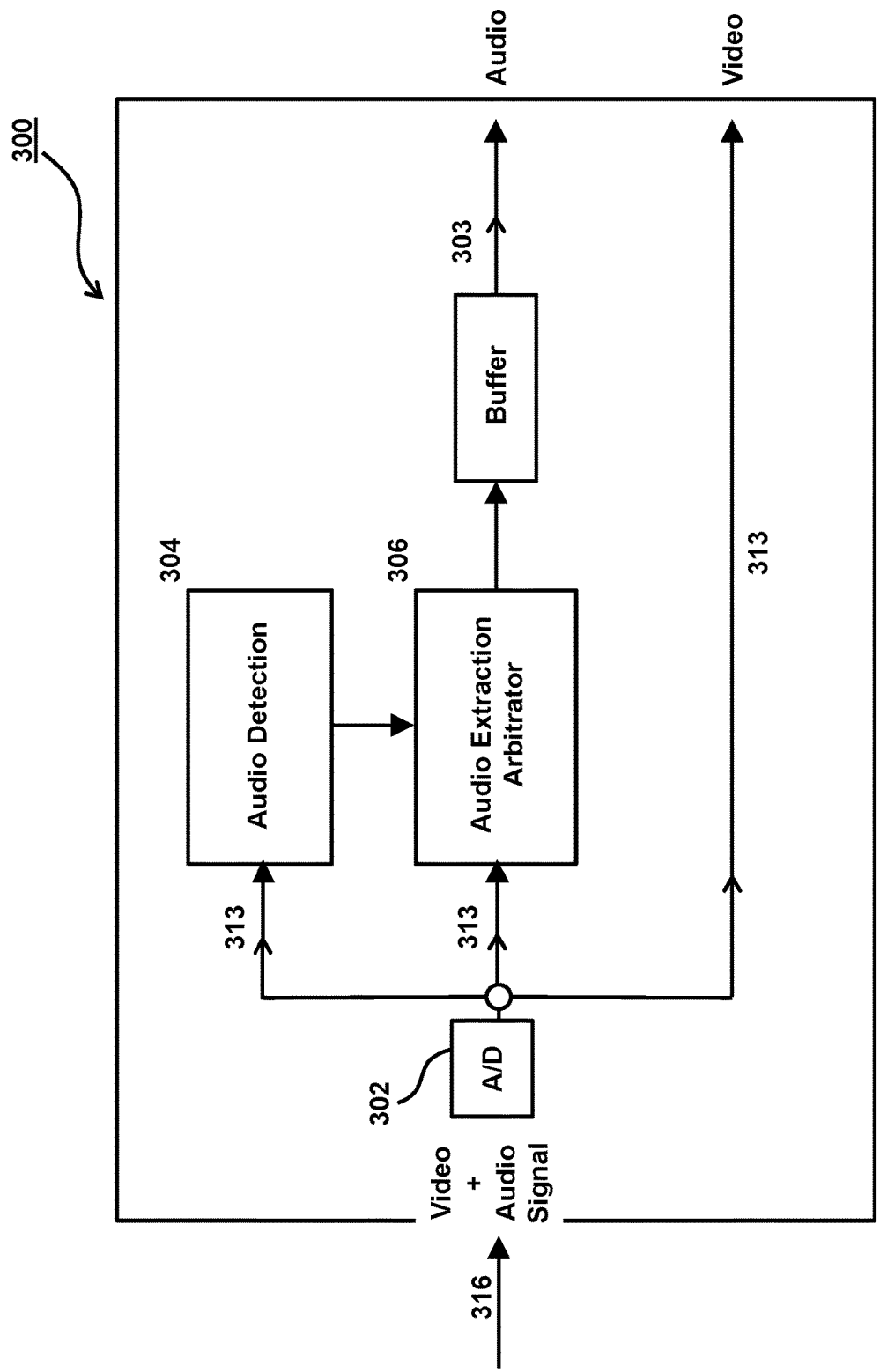
FIG. 3 illustrates a block diagram of an exemplary audio receiver in accordance with one or more implementations.

Referring now to FIG. 3, in conjunction with FIGS. 1 and 2, FIG. 3 depicts an exemplary audio decoder system 300 corresponds to the audio encoder system 100 of FIG. 1. Audio decoder system 300 in conjunction with audio encoder system 100 may comprise an audio/video CODEC system. Decoder system 300 may include ADC 302, audio detection module 304, audio extractor module 306, and FIFO buffer 303. As shown in FIG. 3, ADC 302 may be configured to receive A/V signal 116, 216, 316 in analog format and convert analog A/V signal 116, 260, 316 into the digital domain. ADC 302 may be configured to output A/V signal 116, 216, 316 in digital format as a digital A/V signal 313. ADC 302 may be configured to output A/V signal 313 to audio detection module 304, audio extractor arbiter 306, and a video destination (not shown in FIG. 3). In some embodiments, decoder system 300 may be configured to receive an analog video signal 116, 216, 316 including audio header 215 and quantized audio pulses 213 that was placed in a video blanking interval 210 of the analog video signal 116, 216, 316 based upon a predetermined sampling frequency.

In some embodiments, audio extractor arbiter 306 may include a video decoder sync slicer (not shown in FIG. 3). Detecting the presence of an audio header may include utilizing information from the sync slicer function of a video decoder to aid the detection of audio header 215 at one or more predefined locations/time intervals according to the video transmission protocol and resolution of A/V signal 313. In one embodiment the sync position detection may provide a predetermined search range for detecting the presence of an audio header. The search range may include a time interval of video signal 111 which includes the video blanking interval. In other embodiments other functionality of the video decoder may aid in the detection of audio header 215.

In some embodiments, audio detection module 304 may be configured to detect the presence of audio header 215 contained in video blanking interval 210. In response to detecting audio header 215, audio detection module 304 may be configured to communicate the presence of audio data to the audio extractor arbiter 306. In response, audio extractor arbiter 306 may be configured to extract audio samples 213 from video blanking portion 210, by extracting the digitized AV sample 313 at predetermined timing intervals corresponding to the location of header 215 detected by audio detection module 304. In some embodiments, audio extractor arbiter 305 may be configured to convert the extracted audio data, back to an original value with reference to the header level of header 215. In one embodiment, audio extractor 305 utilizes the header level for recovering a DC offset value added onto the quantized audio data 103 during transmission. Doing so will prevent the quantized audio data from being identified as a horizontal sync signal as the signal swings low. Next, audio extractor 306 may be configured to transmit the restored audio data samples to buffer 303 for later retrieval. In one embodiment, Audio extractor 306 may include a local audio clock encoder (not shown in FIG. 3) with substantially the same corresponding audio sampling frequency as adopted on the transmitter side. Substantially the same means the difference is negligible. In some embodiments, reconstructing the continuous audio signal includes using a predetermined audio sampling rate corresponding to a sampling rate of an upstream audio encoder (e.g., audio encoder system 200). It is noted that the nomenclature of "upstream" and "downstream" is used for illustrative purposes, and specifically indicative of a particular direction.

In one embodiment, audio extractor 306 may include clocking functionality for synchronizing the reconstruction of audio data. Audio extractor arbiter 306 may include one or more digital signal processors (DSP), field programmable gate arrays (FPGA) and or application specific integrated circuits (ASIC). In one embodiment clocking circuitry of audio extractor arbiter 306 may include one or more of phase locked loop (PLL) clock, a non-PLL clock, a quartz crystal oscillator, and LC resonance tank circuit, alone and/or in combination. Local audio clock circuitry of audio extractor arbiter 306 may include additional timing and signal conditioning functionality including, for example, fan-out buffers, multipliers and dividers, synthesizers, alone and/or in combination. Local audio clock may be utilized for retrieving audio data from FIFO buffer 306 in a periodic fashion to reconstruct the original audio signal in digital format and output a continuous audio signal 303. However, due to different clock references of the transmitter and receiver clocks, some clock frequency difference may be present causing variation in sampling frequency between the transmitter and receiver, which may require correction.

In some embodiments, the receiver reconstruction clock frequency should be substantially same as the transmitter sampling clock frequency. Substantially same means any difference is negligible. For example, these differences are due to both receiver and transmitter have their independent clock reference. Even though the specified frequency is the same on both sides, however, due to the free running nature of these clocks, they cannot be the same or synchronized. In some embodiments, in the case that the transmitter sampling frequency and receiver sampling frequency are not substantially the same, interpolation of the received data may be performed to reconstruct the original audio signal at the receiver's sampling rate and to prevent FIFO buffer overrun or underrun over times due to the difference in sampling frequency. As such, the FIFO buffer size can be reduced. Interpolation, also referred to as rate matching, in this manner eliminates the need for complicated and resource intensive synchronization of audio and video signal, and also eliminates the need to consider the video frame boundary. Interpolation, according to one or more embodiments, also does not require calculating and buffering the audio data based on the frame periodicity. Rather, the difference in sampling frequencies between the transmitter and receiver can be corrected by interpolating the received audio samples according to the differences (e.g., frequency difference between receiver and transmitter).

Figure 4:
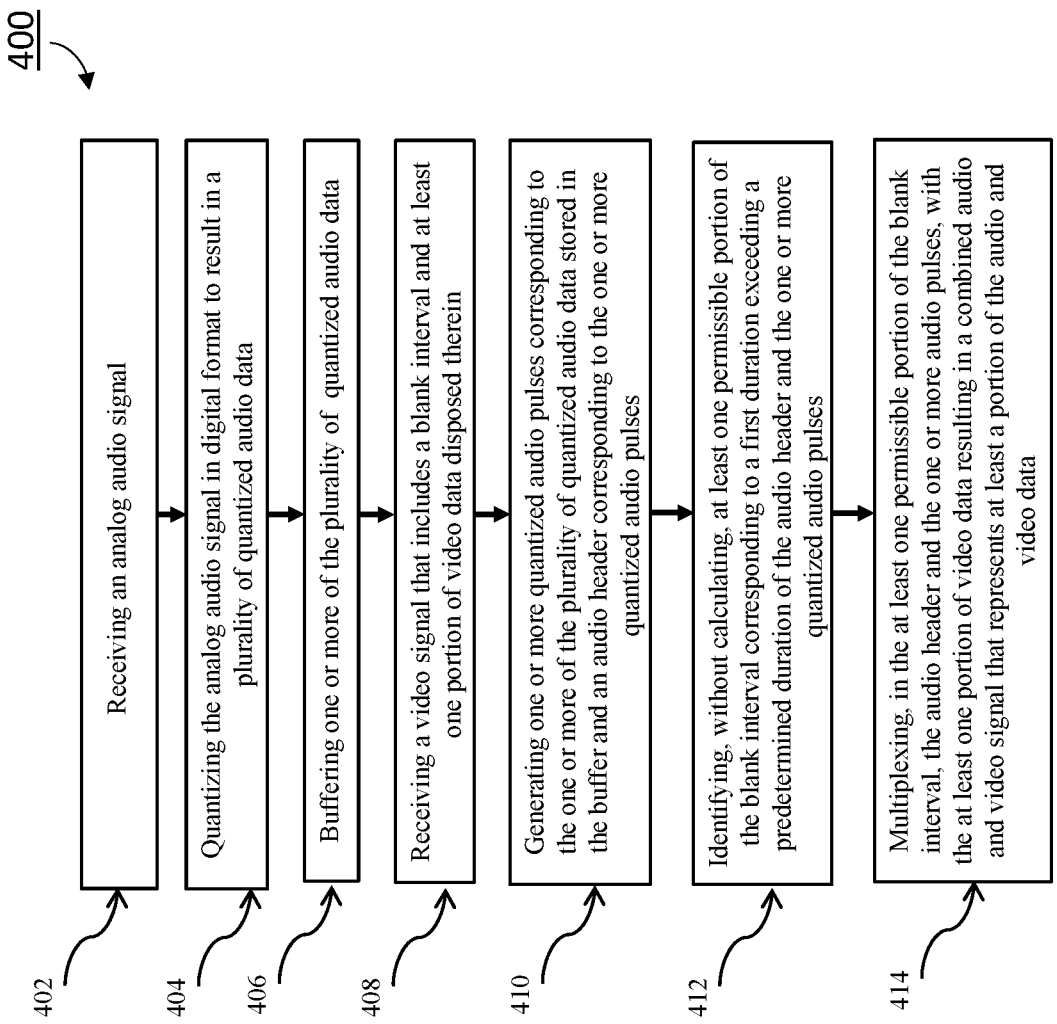
FIG. 4 illustrates a flow chart of a method of transmitting an audio signal data in accordance to one or more embodiments of the invention.

Referring now to FIG. 4, FIG. 4 depicts a flowchart of an exemplary method 400 in accordance with one or more exemplary implementation described herein. Method 400 may begin at an operation 402, receiving an audio signal, which may be analog or digital in form. At an operation 404, quantizing the analog audio signal in digital format, or receiving the digital portion. At an operation 406, buffering one or more quantized audio data. At an operation 408, receiving a video signal comprising a blank interval and a video interval. At an operation 410, combining, an audio header and at least a portion of the buffered audio data in the blank interval of the video signal. The method may conclude at an operation 412, converting the combined digital audio/video signal to analog and transmitting the combined audio/video signal comprising the audio header and at least the portion of the buffered audio data a downstream video receiver wherein the header data is detected and extracted and utilized to restore the audio signal.

Figure 5:
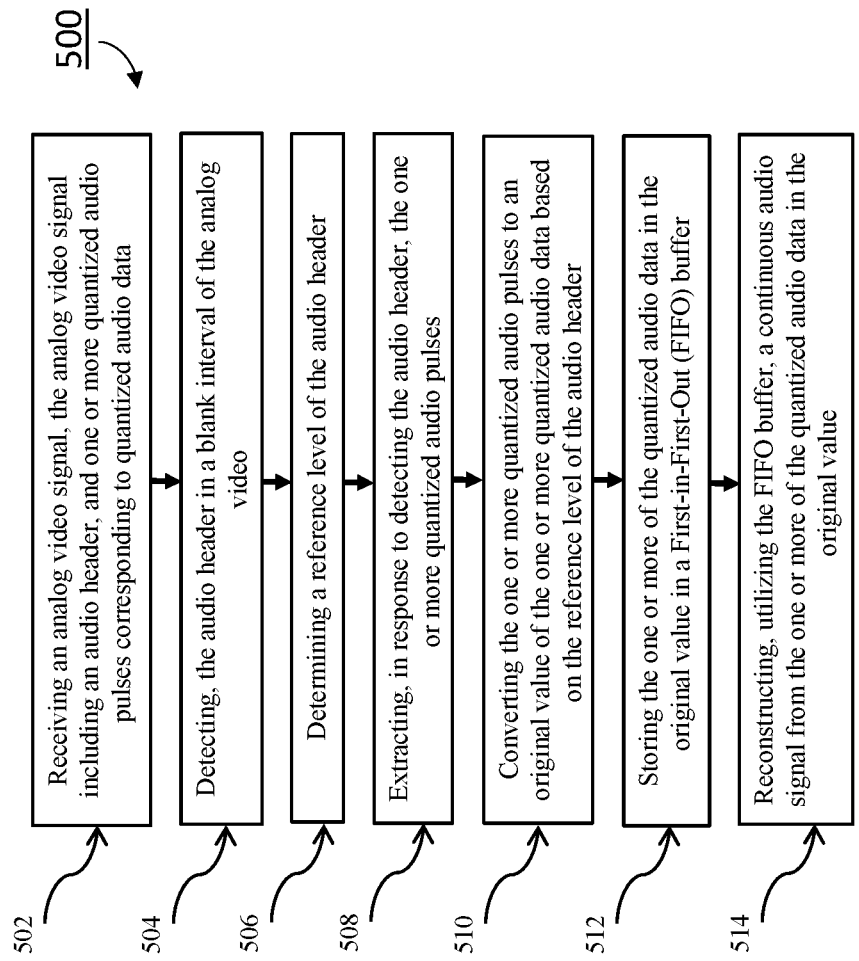
FIG. 5 illustrates a flow chart of a method of receiving an analog video signal in accordance with one or more embodiments of the invention.

Referring now to FIG. 5, FIG. 5 depicts a flowchart of an exemplary method 500 in accordance with one or more exemplary implementation described herein. Method 500 may begin at an operation 502, receiving an analog video signal, the analog video signal including one or more audio headers, and one or more quantized audio pulses corresponding to quantized audio data or digital data portions. For example, each of the one or more audio headers are followed by one or more quantized audio pulses during the video blanking time. At an operation 504, detecting the audio header in a blank interval of the analog video. At an operation 506, determining a reference level of the audio header. At an operation 508, extracting, in response to detecting the audio header, the one or more quantized audio pulses. At an operation 510, converting the one or more quantized audio pulses to an original value of the one or more quantized audio data based on the reference level of the audio header. At an operation 512, storing the one or more of the quantized audio data in the original value in a First-in-First-Out (FIFO) buffer. The method may conclude at an operation 514, reconstructing, utilizing the FIFO buffer, local audio clock and an extrapolator a continuous audio signal from the one or more of the quantized audio data in the original value.

As discussed above, FIGS. 1-5 describe some embodiments wherein digitally sampled audio data or digital audio data is converted to an analog voltage level. The analog voltage level is set proportional to the digital sample value and superimposed onto the analog video signal at predefined time slot in the horizontal blanking period preceded by a start pulse. However, due to the limited resolution of the DAC (digital-to-analog converter) on the transmitter side and limited resolution of the ADC (analog-to-digital converter) on the receiver side, the dynamic range or SNR (signal-to-noise ratio) that can be achieved is also limited. This results in poor SNR and background noise on the audio channel performance. Improving audio performance may be achieved by utilizing high resolution (14-bit and over) DAC and ADC. Yet this approach is resource intensive. However, transmitting audio sample data in a native digital format, in accordance with one or more embodiments described herein, may alleviate SNR, thus achieving high quality audio channel performance, while also conserving resources.

Figure 6:
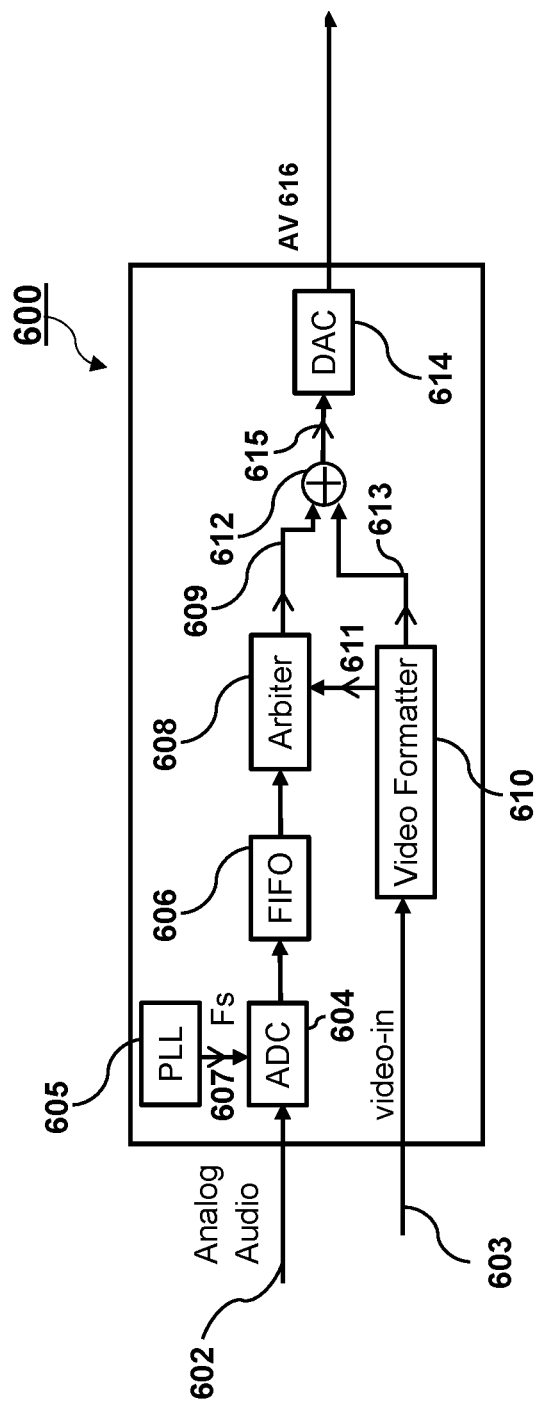
FIG. 6 illustrates a block diagram of an exemplary video transmitter in accordance to one or more embodiments of the invention.
Figure 7:
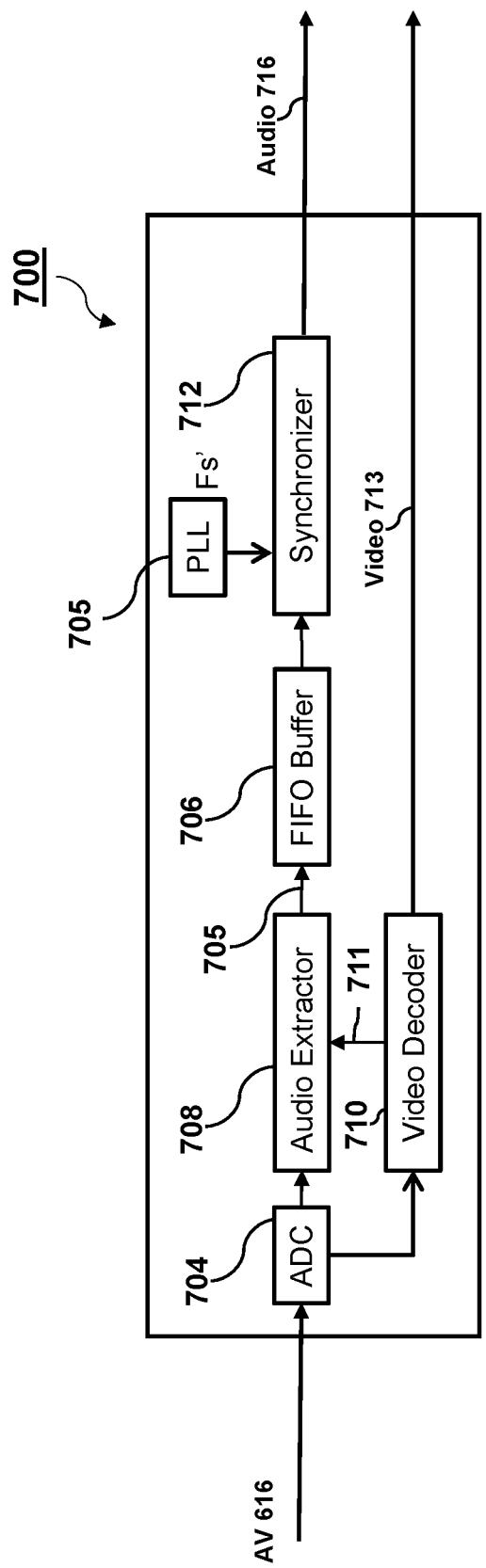
FIG. 7 illustrates a block diagram of an exemplary video receiver in accordance to one or more embodiments of the invention.

Referring now to FIGS. 6-7, in conjunction with FIG. 1 and FIG. 3, FIGS. 6-7 depict a transceiver system having video transmitter 600 and video receiver 700, respectively. For example, FIG. 6 may be similar to FIG. 1, however, different in that the data output from the arbiter representing analog or digital pulses data. Video transmitter 600 and video receiver 700 block diagrams may be similar to transmitter/receiver 100, 300 as depicted in FIG. 1 and FIG. 3, wherein similarly labeled parts and ones and tens level numbers correspond to similar structures having similar functionality. Instead of analog level representation as described in FIGS. 1-5 above, transmitter/receiver 600, 700 are configured for transmitting audio data over a video signal by way of sending audio data in a native digital form (e.g., 12 bit or 24 bit serial digital data stream). For example, in some embodiments corresponding to voice grade audio, 13 to 16 bits are typically sufficient. In other embodiments having high definition audio, 24 bits may be utilized.

In some embodiments, video transmitter 600 (also referred to simply as "transmitter") may include ADC 604, FIFO 606, arbiter 608, video formatter 610, combiner 612, and DAC 614. As shown in FIG. 6, ADC 604 receives analog audio signal 602 and clock signal 607 as input. Clock signal 607 may correspond to a phase-lock-loop (PLL) configured for providing clock functionality (e.g., PLL 605). In some embodiments, PLL 605 may be part of video transmitter 600, or may be separated from, and in wireless communication with, video transmitter 600. For example, in some embodiments, video transmitter 600 may be configured to receive clock signal 607 from an external source (not shown). Clock signal 607 operates at a frequency Fs. In some embodiments, Fs. may include: 8, 16, 32, 44.1, 48 or 96 KHz.

In some embodiments, an operation of video transmitter 600 may include receiving, as input, analog audio signal 602 by way of ADC 604 or digital audio signals. ADC 604 performs sampling of analog audio signal 602 periodically at the rate of Fs, based on the sampling clock signal 607. The sampled audio data or the digital audio data is then transmitted to FIFO 606 for storage in chronological order. Since the extracted audio data samples may not come in periodically, FIFO buffer 606 also facilitates the non-periodic insertion of audio samples. For example, the audio signal can be sampled periodically at the rate of Fs. The FIFO buffer then actually facilitates the non-periodic insertion of audio samples onto the video blanking time available for audio slot. (The video row period is not synchronized with the Fs. Some of the vertical blanking rows are reserved for other data communication and not available for audio transmission). FIFO buffer 606 outputs stored audio samples in response to command signals from arbiter 608.

In some embodiments, arbiter 608, utilizing timing signals 611, checks for the availability of audio data samples stored in FIFO buffer 606 and checks for the availability of video blanking period from the video encoder/formatter. Checks for the availably of audio data stored in FIFO buffer 606 may be implemented by command signals including, for example, a polling/calling function of arbiter 608. Arbiter 608 may read/call audio data stored in FIFO buffer 606 and formats the digital audio data for transmission over the blanking time thereby outputting digital audio stream 609. Formatting audio data for producing digital audio stream 609 may include generating a start code header in serial bit format.

In some embodiments, similar to that as shown and described in FIG. 1, video formatter 610 may receive as input video-in signal 603 and output digital video signal 613 to combiner 612. As discussed above, video formatter 610 communicates timing signals 611 to arbiter 608. For example, in some embodiments arbiter 608 formats audio packets by adding digital audio header and serialized audio data bit stream following a predefined format, or it can also be digitally encoded or appended with redundancy bits for the purpose of error checking and correction to improve the reliability of the transmission in the presence of noise. Each bit of the stream is a number of same digital data byte/code that represents the height and duration of the digital bit pulse when converted to the analog domain. This is similar to the audio transmission except that the pulse height is typically fixed since the audio data information is transmitted digitally as 1/0 bit stream at higher speed instead of the variable height pulses at lower speed. Each variable height pulse in analog transmission is equivalent to a series of 13-16 1/0 shorter pulses in digital transmission, plus optional redundancy bits.

Together with the start code header, digital audio stream 609 may be combined by superposition with digital video signal 613, via combiner 612. Superimposing digital audio stream 609 may be implemented by utilizing timing signals 611 and implementing time division multiplexing (TDMA). For example, timing signal 611 facilitate sending digital audio stream 609 at mutually exclusive time slots. Combined digital audio and video data 615, containing both audio and video data in the digital domain, is then converted to analog domain by DAC 614. Thus, DAC 614 outputs analog audio and video (A/V) stream 616 for downstream transmission to video receiver 700.

Referring now to FIG. 7, FIG. 7 depicts video receiver 700 (also referred to as simply "receiver") in accordance with some embodiments described herein. As shown in FIG. 7, video receiver 700 includes ADC 704, audio extractor 708, FIFO buffer 706, data synchronizer 712, and video decoder 710. Video receiver 700 receives as input analog A/V stream 616, via ADC 704. Analog A/V stream 616 containing both audio and video data is converted back to digital domain by ADC 704. After converting analog A/V stream 616 to the digital domain, ADC 704 outputs A/V stream 616 to audio extractor 708 and video decoder 710.

Video decoder 710 receives A/V stream 616 via ADC 704 and decodes and outputs the baseband video signal (YUV) 713 for display to the user. Video signal 713 corresponds to the original video-in signal 603. Video decoder 710 communicates timing signals 711 to audio extractor 708. In some embodiments, video decoder 710 may utilize time division multiplexing access to process and output digital video signal 713. Video decoder 710 decodes the video signal and provides the necessary timing information to audio extractor 708. In some embodiments, extractor 708 may be separated into audio (header) detector and extractor similar to the analog counterpart. Based on timing signals provide by video decoder 710 and the detected digital audio header, audio extractor 708 extracts audio data from A/V stream 616 and outputs audio data to FIFO buffer 706.

Since the extracted audio data samples does not come in periodically due to the fact that the period of the video blanking (i.e. video line period) is not the same as the audio sample period, extracted audio samples may be stored in FIFO buffer 706. FIFO buffer 706 outputs stored audio data to synchronizer 712. In some embodiments, synchronizer 712 receives PLL 705 clock signal having a signal frequency (Fs') at substantially the same rate as clock 605, frequency (Fs). As discussed above, transmitter and receiver are typically located remotely from each other with connection only by one video cable. This is desirable to reduce cost and increase efficiency so that only a single low cost cable is needed to route between transmitter (e.g., camera) and receiver (e.g., display/recorder). Each side has its own free running reference clock and cannot be guaranteed to have exactly the same frequency and phases or synchronized. Therefore, only substantially the same frequency can be expected. Even though both sides are running at 8 KHz, they will not be the same. In some embodiments, synchronizer 712 retrieves audio data samples stored in FIFO buffer 706 and calculates the correct data at its output based on signal Fs'. Based on the corrected output data, data synchronizer 712 outputs a digital audio stream 716. In some embodiments, calculating correct data at the output is performed by extrapolation from adjacent samples based on constantly tracking the difference between Fs and Fs' by checking the availability of incoming data samples. For example, if Fs' is faster, then it will run out of samples to use.

Figure 8:
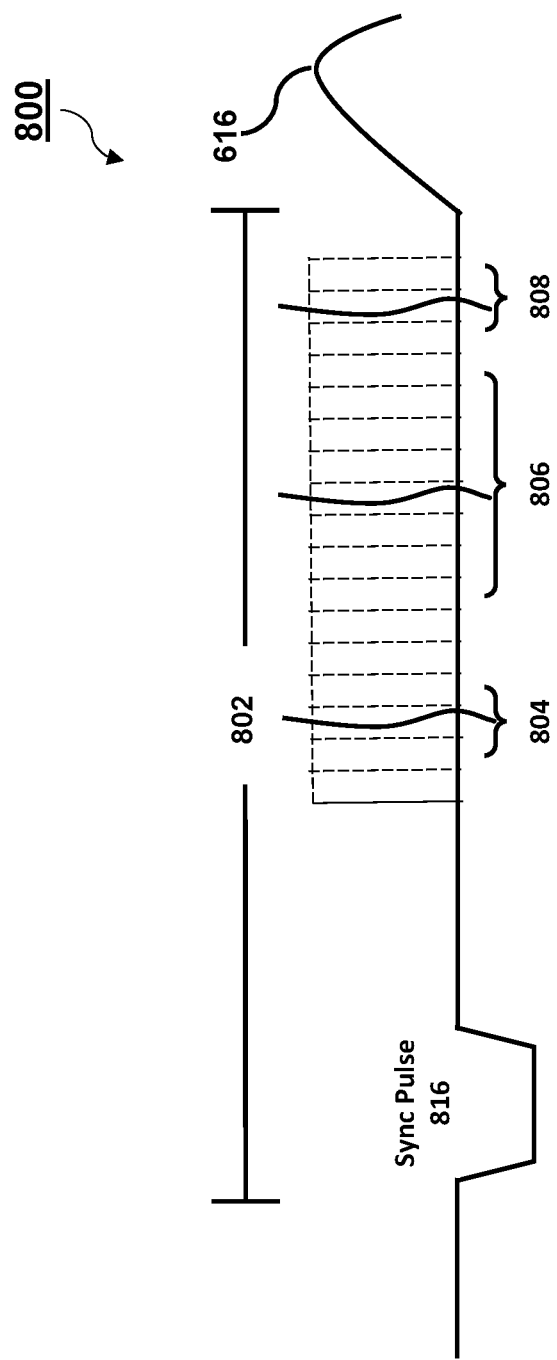
FIG. 8 illustrates a schematic diagram for an analog video and audio signal in accordance with one or more embodiments of the invention.

Referring now to FIG. 8 in conjunction with FIGS. 6-7, instead of transmitting audio utilizing a digital-to-analog converted analog level corresponding to the digital code (e.g., as discussed in FIGS. 1-5 above), downstream audio transmission waveform 800 may be utilized. As shown in FIG. 8, waveform 800 may include video blanking interval 802 having sync pulse 816, digital start code pattern 804, audio data 806, and digital end code pattern 806 contained therein. For example, in some embodiments, arbiter 608 together with video formatter 610 manage the detection of the video blanking period interval 802 in A/V stream 616. This may be performed in a same or similar manner as video encoder 110 and arbiter 108 as taught in the discussion of FIGS. 1-5 above. In some embodiments, A/V stream 616 is the final output generated by arbiter 608 and video formatter 610. Arbiter 608 gets the timing information including, for example, H/V sync, line count and pixel count, for determining the proper video blanking period that the audio data packet can be inserted.

In some embodiments, the format of the transmitted audio data corresponding to A/V stream 616 may correspond to a serial digital data stream in native form. For example, start code pattern 804 may be initially sent and followed by sampled digital audio data 806 in serial bit stream format, with optional redundancy bits for error correction. In one embodiment, digital audio data 806 may be in its native form transmitted high bit first. In another embodiment, digital audio data 806 may be in its native form transmitted low bit first. In some embodiments, arbiter 608 and audio extractor 708 may process digital audio data 806 with or without error correction capability.

In some embodiments, A/V stream 616 may be encoded for various purposes including facilitating a user communication channel between upstream and downstream users. In some embodiments, other types of data payload may be implemented (e.g., meta data related to the video or control data. In these embodiments, maintaining periodicity may not be important and the synchronizer/extrapolator in the receiver side may not be needed.

Discussed in further detail below, in some embodiments, depending on the blanking space (i.e., vertical blanking space or horizontal blanking space), two or more digital audio data samples may be transmitted based on the predefined protocol. For example, in the analog domain, one audio sample is represented by one variable height pulse. More audio samples may be sent under the same header by adding more sample pulses after the first sample. This is similar for the digital case. The number of samples to be sent together need to be predefined so receiver knows how many samples to retrieve. In the case of variable number of samples, an end-of-transmission flag is needed after the valid sample to indicate no more valid sample. In some embodiments, transmitting audio data in a native digital format superimposed (i.e., on top) of the analog video may be extended to two-way simultaneous audio communication, which is discussed in further detail below.

Figure 9:
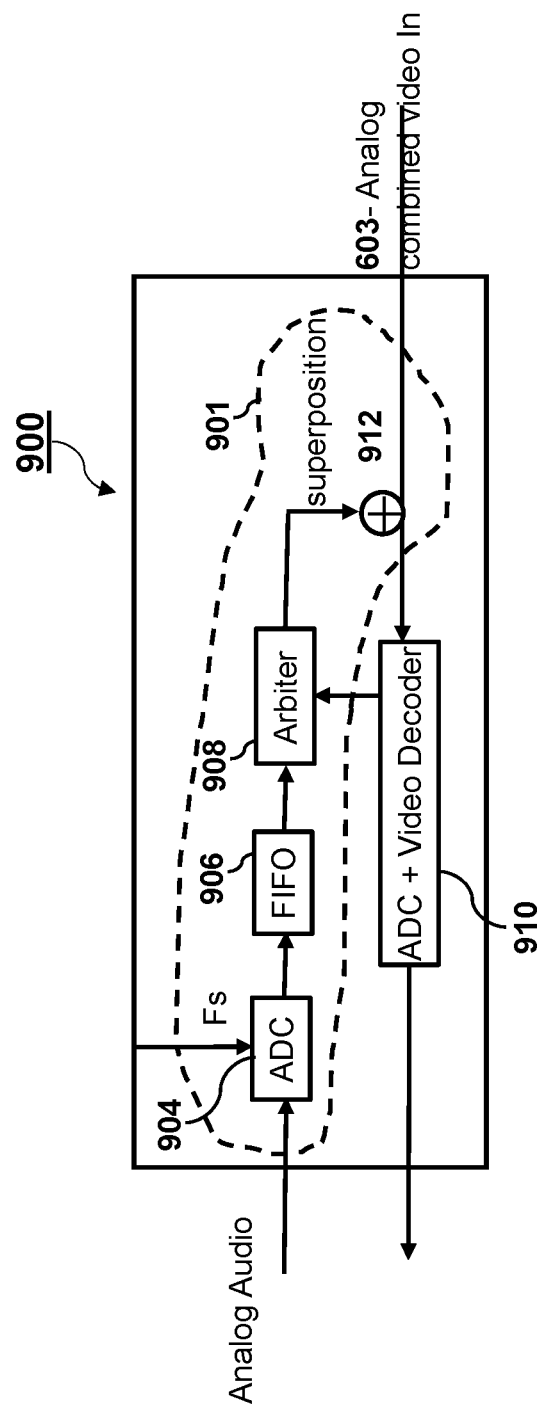
FIG. 9 illustrates a block diagram of an exemplary video receiver that includes opposite direction audio signal transmitter in accordance to one or more embodiments of the invention.
Figure 10:
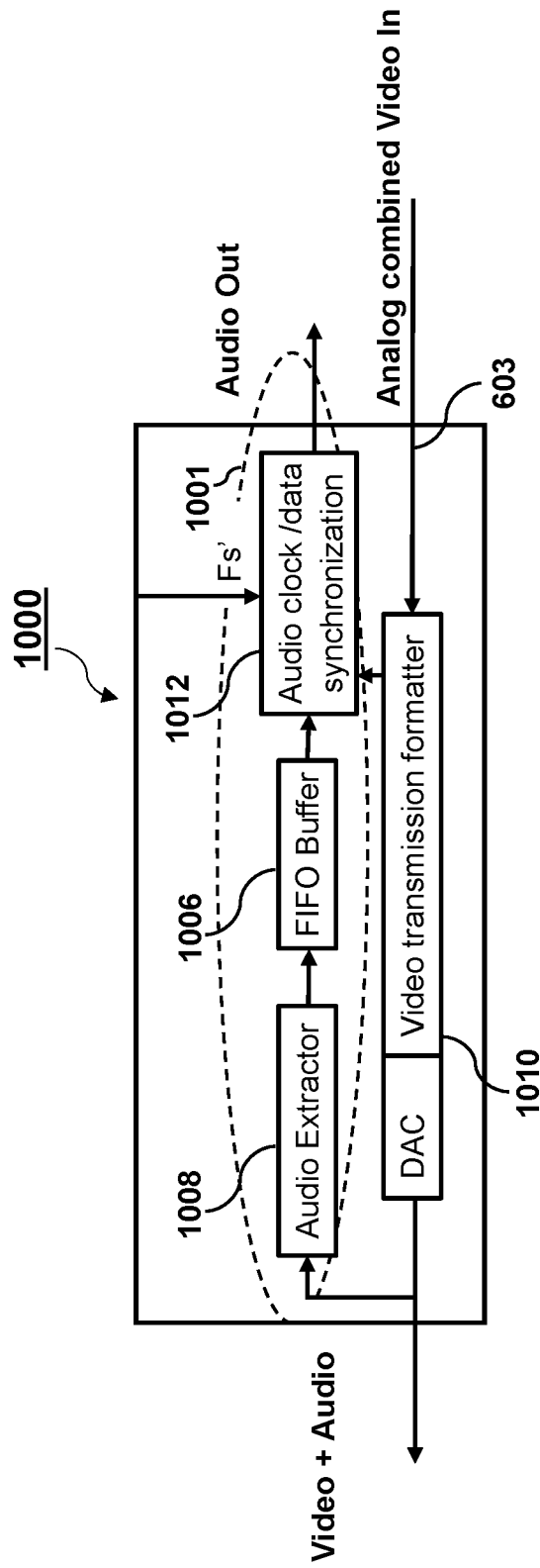
FIG. 10 illustrates a block diagram of an exemplary video transmitter that includes an opposite direction audio signal receiver in accordance to one or more embodiments of the invention.
Figure 11:
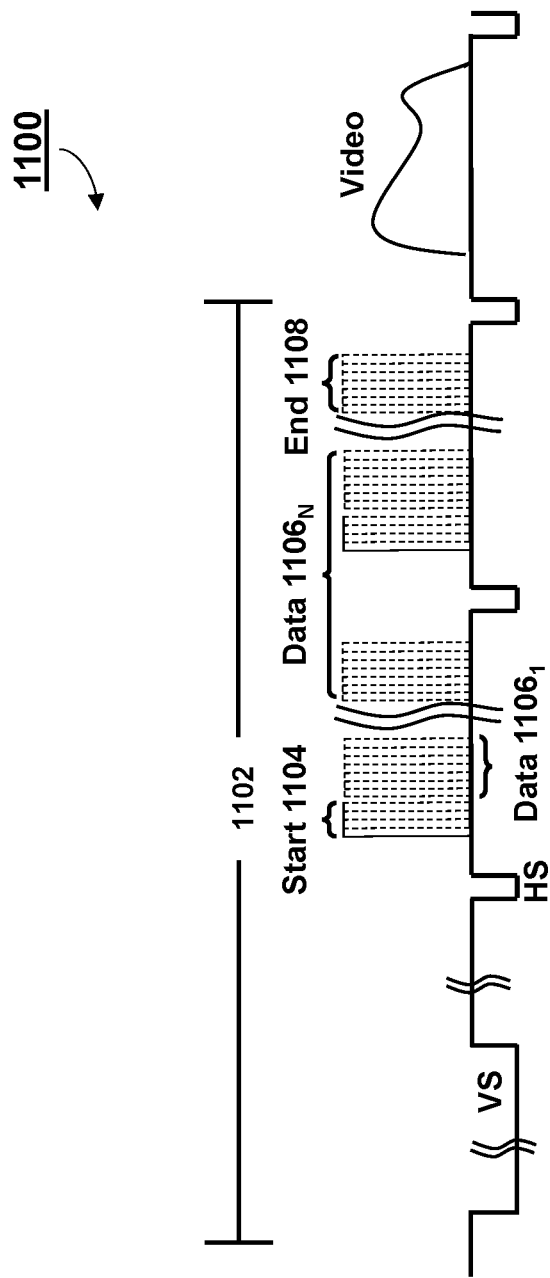
FIG. 11 illustrates a schematic diagram for an analog video and audio signal in accordance with one or more embodiments of the invention.

Referring now to FIGS. 9-11; FIGS. 9-10 depict embodiments corresponding to a video transmission protocol that includes functionality for 2-way simultaneous audio transmission by utilizing an upstream channel. Video receiver 900 and video transmitter 1000 block diagrams may be similar to transmitter/receiver 600, 700 as depicted in FIG. 6 and FIG. 7, wherein similarly labeled parts and numbers correspond to similar structures having similar functionality with respect to the ones and tens position numbers. Accordingly, FIG. 9 illustrates a block diagram of video receiver 900 that includes an opposite direction audio signal transmitter configured for upstream (reverse) audio transmission, and FIG. 10 illustrates a block diagram of video transmitter 1000 that includes an opposite direction signal receiver configured for upstream (reverse) audio receiving.

Although the processing for the audio transmission and reception are similar to the downstream audio processing as described above in FIGS. 6-8 (e.g., similar to transmitter/receiver 600,700), the method of audio data insertion and extraction for upstream/opposite direction audio transmitter 901 and upstream audio receiver 1001 are different due to the fact that video transmission is one way (downstream) only. For example, for the TDMA operation in this case, the available space for other uses that is not occupied by the video data and video synchronization timing are the video blanking time, either line (horizontal) blanking or field/frame (vertical) blanking. For 2-way transmission, an exemplary implementation is to use one blanking time for downstream and another for upstream. Otherwise, other type of identification will be needed like different headers so they will not be mixed up.

For example, typically, the downstream data is transmitted in the horizontal blanking time excluding the vertical blanking lines. The upstream data is transmitted in the predefined vertical blanking lines not used for other purposes. Accordingly, the upstream audio transmission protocol as described herein facilitates reverse direction transmission (e.g., upstream transmission from video receiver 700 to video transmitter 600) by utilizing the vertical blanking lines of analog video-in signal 603, which have not been used for video or downstream audio transmission. In general, they occupy lines that are mutually exclusive, i.e. the horizontal blanking time in those vertical blanking lines used for upstream transmission will not be used for downstream transmission. Due to this fact and the fact that the video line period frequency is different than the audio sample frequency, the upstream audio transmission is also not periodic. The upstream audio data are collected over the frame period before transmitting all during the vertical blanking lines and transmission is also not periodic. Therefore, converting back to the periodical signal at receiver side using local Fs' is required.

As shown by the dashed line in FIGS. 9-10, in some embodiments, video receiver 900 includes upstream/opposite direction audio transmitter 901. Video receiver 900 resides on the video receiver side (e.g., corresponding to video receiver 700). Video transmitter 1000 includes upstream/opposite direction audio receiver 1001. Video transmitter 1000 resides on the video transmitter side (e.g., video transmitter 600). Upstream audio transmitter 901 and upstream audio receiver 1001 are configured for implementing 2-way simultaneous audio transmission, as discussed in detail below.

FIG. 11 depicts an exemplary upstream audio transmission waveform 1100, in accordance with some embodiments described herein. In order to achieve the minimum audio sample rate (e.g., 8K, 16K, or 32 samples per second), due to limited vertical/horizontal blanking lines per frame in the video signal, multiple digital audio samples may be transmitted per horizontal line. As depicted in FIG. 11, the transmission on each video blanking line 1102 starts with digital start pattern 1104 following horizontal sync (HS). Digital start pattern 1104 may be followed by multiple digital audio data samples $1106_N$. In some embodiments, end pattern 1108 may be implemented to indicate the end of audio data samples $1106_N$. In some embodiments, end pattern 1108 may be utilized when the number of audio sample varies per line. In other embodiments, a fixed number of samples is predetermined per line. When a predetermined fixed number of samples per line is implemented, an end pattern is not required.

In some embodiments, arbiter 908 of upstream audio transmitter 901 relies on video decoder 910 to determine proper vertical blanking lines of the incoming video (corresponding to 603 in FIG. 6) and the time slots within vertical blanking line for transmission. For example, arbiter 908 may retrieve audio data from the FIFO buffer 906 and format the signal with start code 1104 and one or more audio data samples $1106_N$ for proper transmission. The start code and/or end code pattern 1106, 1108 for each line are inserted before being electrically superimposed onto the incoming video signal (corresponding to 603 in FIG. 6) by combiner 912. By such insertion, a start and/or end code 1104, 1108, may be detected on the video transmitter side by upstream audio receiver 1001, as discussed in FIG. 10.

Referring back now to FIG. 10, in some embodiments, upstream audio receiver 1001 on the video transmitter 1000 retrieves information from video formatter 1010 for determining which video blanking line(s) to monitor according to predefined protocol. In some embodiments, the predefined protocol includes the start code format, bit pulse duration, number of bits per sample, samples per line in the case of fixed number, end code, signed/unsigned, bit order (MSB or LSB first). Upstream audio receiver 1001 then extracts digital audio samples utilizing audio extractor 1008. Audio extractor 1008 may extract audio data samples $1106_N$ following detection of start code 1104. Upon detecting start code 1104, audio extractor 1008 transmits audio data samples $1106_N$ to FIFO buffer 1006. FIFO buffer 1006 stores sampled audio data in chronological order to be reconstructed by synchronizer 1012. In some embodiments, synchronizer 1012 retrieves data from FIFO buffer 1006 and calculates audio output samples based on the receiver audio clock rate Fs', which should be substantially same as transmitter rate Fs, which can use interpolation, also called rate matching as discussed previously. Substantially same means the same frequency but they can be off by few hundred ppm depending the accuracy of the reference clock (i.e., the difference is negligible). The clocks are also not synchronized or having any fixed phase or frequency relationship. For example, the calculation here is similar to what has been described above for downstream receiver. The data is considered packetized instead of periodic in time domain.

Figure 12:
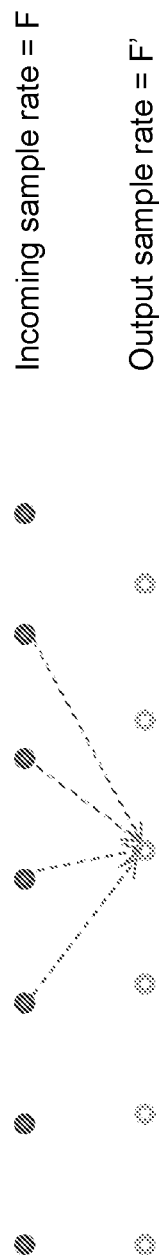
FIG. 12 illustrates the interpolation between the incoming sample rate F and the output sample rate F'.

With respect to interpolation, the audio data rate matching between two substantially same but independent sampling clocks on the transmitter (such as PLL 605 in FIG. 6) and receiver (such as PLL 705 in FIG. 7). To reconstruct the audio data on the audio receiver side (with the upstream audio receiver 1001 on the video transmitter 1000; see also FIG. 6) based on the local free running audio clock (not shown), re-sampling of the incoming audio data sampled with transmitter clock (such as PLL 605 in FIG. 6) is required. The arbiter (such as arbiter 608 in FIG. 6) monitors the rate difference between the incoming data stored into the FIFO 1006 and the target output sampling rate that retrieves data from the FIFO 606. The re-sampling position of the data at the output of the FIFO 1006 is then dynamically adjusted at the synchronizer 1012 based on this rate difference in order to correctly reconstruct the original audio signal using the local free running audio clock. This interpolation is illustrated in the diagram shown in FIG. 12.

While interpolation is described immediately above with reference to the transmitter 600 of FIG. 6 and transmitter 1000 of FIG. 10 that includes the audio receiver 1001, such interpolation can also be used with respect to the audio that is received at the downstream side, such as at receiver 700 illustrated in FIG. 7.

Although the present invention has been particularly described with reference to the preferred embodiments thereof, it should be readily apparent to those of ordinary skill in the art that changes and modifications in the form and details may be made without departing from the spirit and scope of the exemplary embodiments described herein. It is intended that the appended claims encompass such changes and modifications.

What is claimed:

1. A method for transmission of audio over analog video data with a single cable to a receiver, the method comprising:
    receiving, at a transmitter a digital video signal and an audio signal, wherein the audio signal is one of an analog audio signal or a digital audio signal;
    sampling, by an audio analog-to-digital converter (ADC), the audio signal if the audio signal is the analog audio signal;
    storing, in a First-in-First-Out (FIFO) buffer, digital audio data corresponding to the sampled analog audio signal or the digital audio signal;
    reading, by an arbiter, the digital audio data, in response detecting an availability of data in the FIFO buffer;
    formatting serialized audio bits with a digital start code from the digital audio data;
    inserting the serialized audio bits with the digital start code into a blanking period of the digital video signal, thereby generating a combined digital audio and video signal;
    converting, by a digital-to-analog converter (DAC), the combined digital audio and video signal to analog, thereby generating a combined analog audio and video stream including audio data in a native form; and
    transmitting the combined analog audio and video stream over the single cable in one direction to the receiver.

2. The method of claim 1, further comprising:
    receiving, by the receiver, the combined analog audio and video signal;
    converting, by another ADC included within the receiver, the combined analog audio and video signal to a combined digital audio and video signal,
    extracting an audio data stream from the combined digital audio and video signal.

3. The method of claim 2, further comprising:
    storing the audio data stream into another FIFO,
    retrieving the audio data samples from the another FIFO at a rate that is substantially the same as the audio sample frequency at the transmitter side and reconstructing the audio samples periodically into a continuous audio stream; and
    outputting the continuous audio stream.

4. The method of claim 3, wherein the step of retrieving and reconstructing interpolates the audio data samples based upon a frequency difference between the receiver and transmitter.

5. The method of claim 1, further comprising a method of two-way audio transmission, wherein the sampled audio signal is sampled at a first frequency, wherein the transmitter includes a opposite direction audio signal receiver, and wherein the receiver includes an opposite direction audio signal transmitter, comprising:
    receiving, at the opposite direction audio signal transmitter included within the receiver, a second audio signal that is one of a second analog audio signal and a second digital audio signal;
    determining, by an arbiter of the opposite direction audio transmitter and a video decoder of the receiver, one or more vertical blanking lines of the combined analog audio and video stream and one or more time slots within the one or more vertical blanking lines without audio data;
    sampling, by another analog-to-digital converter (ADC) disposed within the opposite direction audio signal transmitter, the second analog audio signal at a second frequency if the second audio signal is the second analog audio signal;
    storing, in another First-in-First-Out (FIFO) buffer disposed within the opposite direction signal transmitter, second digitized audio samples corresponding to one of the second digital audio signal and the second sampled analog audio signal
    inserting a start pattern and one or more second serialized audio data and an end pattern into a vertical blanking interval of the combined analog audio and video stream;
    transmitting, by the opposite direction signal transmitter disposed within the receiver to the opposite direction signal receiver disposed within the transmitter, an audio stream corresponding to the start and/or end patterns and the second serialized audio bits to the transmitter that includes the audio receiver, wherein the transmitting of the audio stream occurs of the single cable in another direction opposite the one direction.

6. The method of claim 5, further comprising:
    receiving, by the opposite direction signal receiver disposed within the transmitter, the audio stream;
    extracting the second serialized audio data based on the one or more vertical blanking lines and one or more time slots into second extracted audio samples;
    storing the second extracted audio samples in a further FIFO buffer disposed within the opposite direction signal receiver; and
    selecting an output sample frequency that is substantially the same as the sampling frequency of the opposite direction signal transmitter; and retrieving the audio samples and outputting a reconstructed audio stream based on the output sample frequency.

7. The method of claim 6, wherein the step of retrieving and outputting interpolates the audio samples based upon a frequency difference between the receiver and transmitter.

* * * * *